United States Patent
Harding, Jr. et al.

(10) Patent No.: US 10,489,348 B2
(45) Date of Patent: Nov. 26, 2019

(54) PERFORMING HASH JOINS USING PARALLEL PROCESSING

(71) Applicant: Alteryx, Inc., Irvine, CA (US)

(72) Inventors: Edward P. Harding, Jr., Boulder, CO (US); Adam D. Riley, Orwell (GB); Christopher H. Kingsley, Longmont, CO (US); Scott Wiesner, Boulder, CO (US)

(73) Assignee: Alteryx, Inc., Irvine, CA (US)

( * ) Notice: Subject to any disclaimer, the term of this patent is extended or adjusted under 35 U.S.C. 154(b) by 243 days.

(21) Appl. No.: 15/652,131

(22) Filed: Jul. 17, 2017

(65) Prior Publication Data

US 2019/0018855 A1    Jan. 17, 2019

(51) Int. Cl.
| | |
|---|---|
| G06F 7/02 | (2006.01) |
| G06F 16/00 | (2019.01) |
| G06F 16/13 | (2019.01) |
| G06F 9/50 | (2006.01) |
| G06F 16/28 | (2019.01) |
| G06F 16/2453 | (2019.01) |

(52) U.S. Cl.
CPC .......... *G06F 16/137* (2019.01); *G06F 9/5066* (2013.01); *G06F 16/2453* (2019.01); *G06F 16/285* (2019.01)

(58) Field of Classification Search
CPC ...... G06F 16/285; G06F 16/35; G06F 16/137; G06F 16/2453; G06F 16/2456; G06F 9/5066
See application file for complete search history.

(56) References Cited

U.S. PATENT DOCUMENTS

| | | |
|---|---|---|
| 5,832,310 A | 11/1998 | Morrissey et al. |
| 5,875,454 A | 2/1999 | Craft |
| 6,564,274 B1 | 5/2003 | Heath et al. |
| 6,606,704 B1 | 8/2003 | Adiletta et al. |
| 6,625,671 B1 | 9/2003 | Collette et al. |
| 8,880,481 B1 | 11/2014 | Harada et al. |
| 9,183,200 B1 | 11/2015 | Liu et al. |
| 9,436,558 B1 | 9/2016 | Per et al. |
| 2004/0236785 A1 | 11/2004 | Greiner |
| 2005/0008011 A1 | 1/2005 | Georgiou et al. |
| 2005/0071579 A1 | 3/2005 | Luck |

(Continued)

OTHER PUBLICATIONS

PCT International Search Report and Written Opinion, PCT Application No. PCT/US18/32557, dated Jul. 27, 2018, 20 pages.

(Continued)

*Primary Examiner* — Bruce M Moser
(74) *Attorney, Agent, or Firm* — Fenwick & West LLP

(57) ABSTRACT

Data records are joined using a computer. Data records in a first plurality of data records and a second plurality of data records are hashed. The data records in the first and second pluralities are respectively assigned to first and second groupings based on the hashes. Associated pairs of groupings from the first and second groupings are provided to a thread executing on a computer processor, and different pairs are provided to different threads. The threads operate on the pairs of groupings in parallel to determine whether to join the records in the groupings. A thread joins two data records under consideration if the hashes associated with the data records match. The joined data records are output.

17 Claims, 6 Drawing Sheets

(56) References Cited

U.S. PATENT DOCUMENTS

| | | |
|---|---|---|
| 2006/0217834 A1 | 9/2006 | Shotwell et al. |
| 2008/0120314 A1* | 5/2008 | Yang ................... G06F 16/2456 |
| 2008/0243764 A1* | 10/2008 | Meijer ................ G06F 16/2456 |
| 2009/0144304 A1 | 6/2009 | Stephens et al. |
| 2010/0115182 A1 | 5/2010 | Murugesan |
| 2012/0124045 A1* | 5/2012 | Pendap ............. G06F 16/24554 |
| | | 707/737 |
| 2012/0166752 A1 | 6/2012 | Taniyama |
| 2012/0310916 A1* | 12/2012 | Abadi ................. G06F 16/2456 |
| | | 707/713 |
| 2013/0138628 A1 | 5/2013 | Bensberg et al. |
| 2013/0339473 A1 | 12/2013 | McCaffrey et al. |
| 2014/0297652 A1 | 10/2014 | Stevens et al. |
| 2014/0337314 A1 | 11/2014 | Potapov et al. |
| 2015/0113535 A1 | 4/2015 | Goda et al. |
| 2016/0147450 A1 | 5/2016 | Derby et al. |
| 2016/0378752 A1 | 12/2016 | Anderson et al. |
| 2017/0103016 A1 | 4/2017 | Stalzer |
| 2018/0246657 A1 | 8/2018 | Sadowski |

OTHER PUBLICATIONS

PCT International Search Report and Written Opinion, PCT Application No. PCT/US2018/042257, dated Sep. 21, 2018, 14 pages.
PCT International Search Report and Written Opinion, PCT Application No. PCT/US18/55890, dated Dec. 7, 2018, 18 pages.
PCT International Search Report and Written Opinion, PCT Application No. PCT/US18/55898, dated Dec. 26, 2018, nine pages.

* cited by examiner

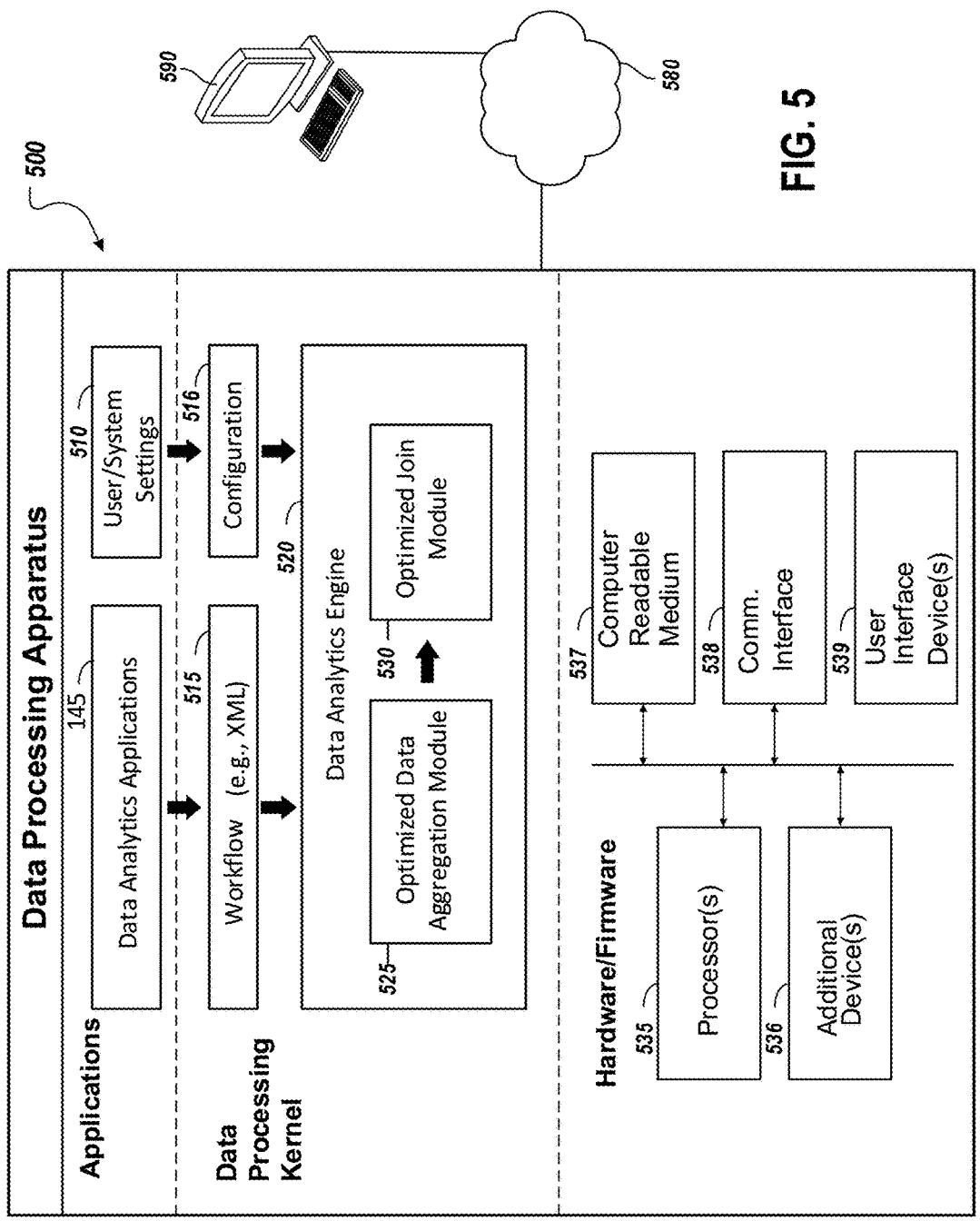

PERFORMING HASH JOINS USING PARALLEL PROCESSING

BACKGROUND

This specification generally relates to data processing techniques, and more specifically to performing hash joins in a way optimized for parallel processing computer systems (e.g., multi-core processors).

The growth of data analytic platforms, such as Big Data Analytics, has expanded data processing into a tool for processing large volumes of data to extract information having business value. Efficient data processing techniques are needed to access, process, and analyze large sets of data from differing data sources for this purpose. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computer devices.

A join algorithm is a data processing technique employed when processing multiple data sets such as those described above. Existing data processing systems can utilize multiple join algorithms, each having respective performance tradeoffs, to perform logical joins between two sets of data (e.g., hash joins, nested loops, sort-merge joins). As an example, the hash join has expected complexity O(M+N), where N and M are the number of tuples of two tables being joined. However, the hash join algorithm may have unfavorable memory access patterns (e.g., random disk access) and may also be slow to execute. Thus, existing data processing systems suffer performance issues when processing join algorithms.

SUMMARY

The above and other problems are addressed by a method, computer, and non-transitory computer-readable memory for joining data records. An embodiment of the method of joining data records using a computer comprises identifying a first plurality of data records and a second plurality of data records and computing a hash for each data record in the first and second pluralities of data records. The method further comprises assigning data records of the first plurality of data records to groupings from a first set of groupings based on the computed hashes and assigning data records of the second plurality of records to groupings from a second set of groupings based on the computed hashes, where each grouping in the second set of groupings associated with a respective grouping in the first set of groupings. The method additionally comprises determining, based on the hash values, whether to join respective data records of a grouping from the first set of groupings with respective data records of an associated grouping from the second set of groupings and, responsive to determining to join respective data records of the grouping from the first set of groupings with respective data records of the associated grouping from the second set of groupings, joining the respective data records. The method also comprises outputting the joined data records.

An embodiment of the computer for joining data records comprises at least one computer processor and a non-transitory computer-readable memory storing computer program instructions executable by the processor to perform operations. The operations comprise identifying a first plurality of data records and a second plurality of data records and computing a hash for each data record in the first and second pluralities of data records. The operations further comprise assigning data records of the first plurality of data records to groupings from a first set of groupings based on the computed hashes and assigning data records of the second plurality of records to groupings from a second set of groupings based on the computed hashes, where each grouping in the second set of groupings associated with a respective grouping in the first set of groupings. The operations additionally comprise determining, based on the hash values, whether to join respective data records of a grouping from the first set of groupings with respective data records of an associated grouping from the second set of groupings and, responsive to determining to join respective data records of the grouping from the first set of groupings with respective data records of the associated grouping from the second set of groupings, joining the respective data records. The operations also comprise outputting the joined data records.

An embodiment of the non-transitory computer-readable memory stores computer program instructions executable by a computer processor to perform operations for joining data records. The operations comprise identifying a first plurality of data records and a second plurality of data records and computing a hash for each data record in the first and second pluralities of data records. The operations further comprise assigning data records of the first plurality of data records to groupings from a first set of groupings based on the computed hashes and assigning data records of the second plurality of records to groupings from a second set of groupings based on the computed hashes, where each grouping in the second set of groupings associated with a respective grouping in the first set of groupings. The operations additionally comprise determining, based on the hash values, whether to join respective data records of a grouping from the first set of groupings with respective data records of an associated grouping from the second set of groupings and, responsive to determining to join respective data records of the grouping from the first set of groupings with respective data records of the associated grouping from the second set of groupings, joining the respective data records. The operations also comprise outputting the joined data records.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

FIG. 5 is a diagram of an example of a data processing apparatus including a software architecture that may be used to implement the systems and methods described according to one embodiment.

Like reference numbers and designations in the various drawings indicate like elements.

DETAILED DESCRIPTION

Figure 1:
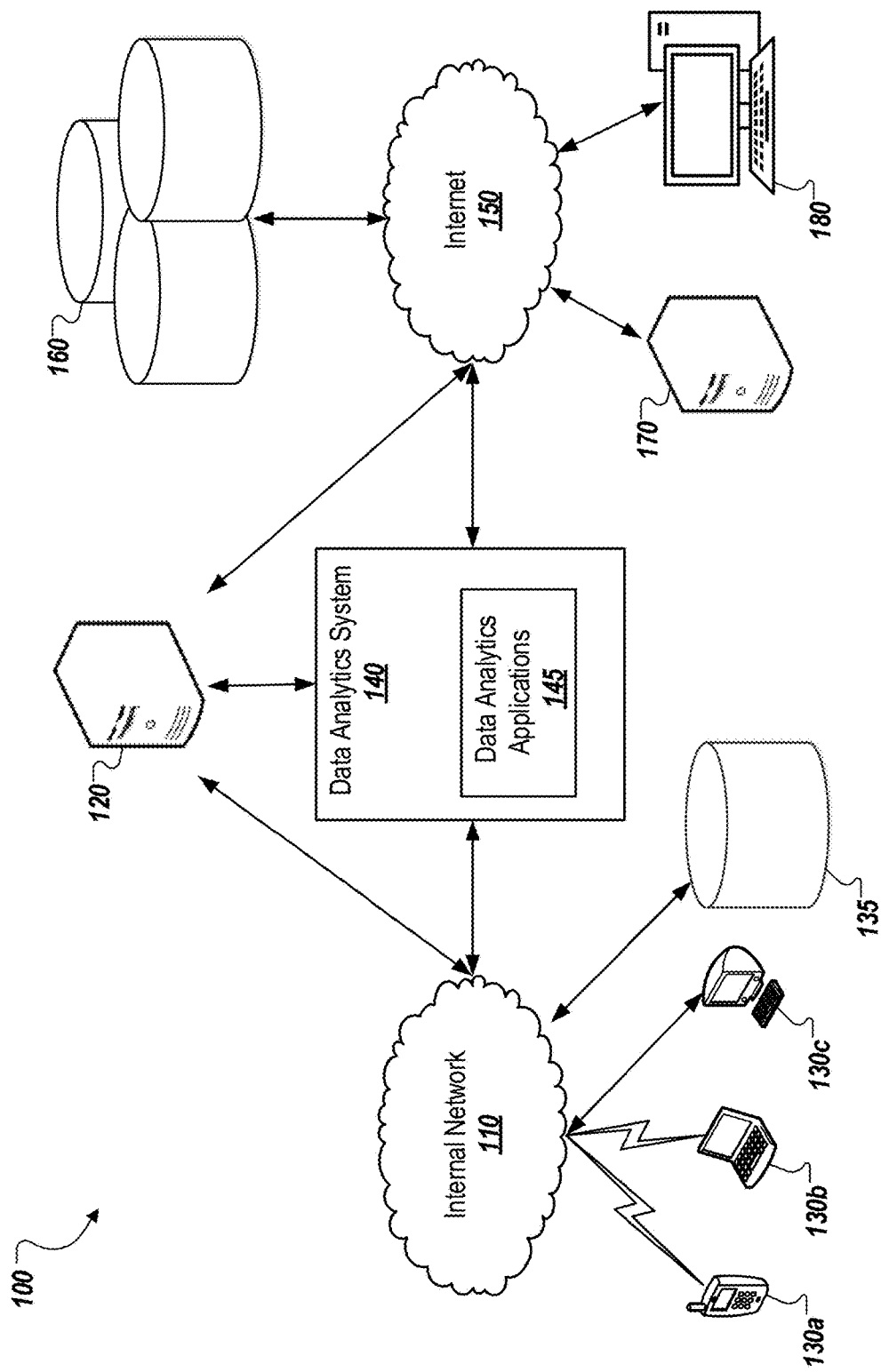
FIG. 1 is a diagram of an example environment implementing a join tool that is optimized for parallel processing computer systems according to one embodiment.

There is an interest in obtaining data that is pertinent to business related functions (e.g., customer engagement, process performance, and strategic decision-making). Advanced data analytics techniques (e.g., text analytics, machine learning, predictive analysis, data mining and statics) can then be used by businesses, for example, to further analyze the collected data. Also, with the growth of electronic commerce (e-commerce) and integration of personal computer devices and communication networks, such as the Internet, into the exchange of goods, services, and information between businesses and customers, large volumes of business related data are transferred and stored in electronic form. Vast amounts of information that may be of importance to a business (e.g., financial transactions, customer profiles, etc.) can be accessed and retrieved from multiple data sources using network-based communication. Due to the disparate data sources and the large amounts of electronic data that may contain information of potential relevance to a data analyzer, performing data analytics operations can involve processing very large, diverse data sets that include different data types such as structured/unstructured data, streaming or batch data, and data of differing sizes that vary from terabytes to zettabytes.

Furthermore, data analytics may require complicated and computationally-heavy processing of different data types to recognize patterns, identify correlations and obtain other useful information. Some data analytics systems leverage the functionality provided by large, complex and expensive computer devices, such as data warehouses and high performance computers (HPCs), such as mainframes, to handle larger storage capacities and processing demands associated with big data. In some cases, the amount of computing power needed to collect and analyze such extensive amounts of data can present challenges in an environment having resources with limited capabilities, such as the traditional information technology (IT) assets available on the network of a small business (e.g., desktop computers, servers). For instance, a laptop computer may not include the hardware needed to support the demands associated with processing hundreds of terabytes of data. Consequently, Big Data environments may employ higher-end hardware or high performance computing (HPC) resources generally running on large and costly supercomputers with thousands of servers to support the processing of large data sets across clustered computer systems. Although speed and processing power of computers, such as desktop computers, have increased, nonetheless data amounts and sizes in data analytics increased as well, making the use of traditional computers with limited computational capabilities (as compared to HPCs) less than optimal for some data analytics technologies. As an example, a compute-intensive data analytics operation that processes one record at a time in a single thread of execution may result in undesirably longer computation times executing on a desktop computer, for instance, and further may not take advantage of the parallel processing capabilities of multi-core central processing units (CPUs) available in some existing computer architectures. However, incorporating a software architecture, usable in current computer hardware, which provides efficient scheduling and processor and/or memory optimization, for example using a multi-threaded design, can provide effective data analytics in lower complexity, or traditional IT, computer assets.

The techniques and systems described can be used to increase data processing efficiency in parallel-processing computing environments, such as independent threads running on multiple cores on the same CPU. More specifically, the disclosed techniques can function to implement a hardware-conscious hash join process that effectuates the distribution of join operations across a large number of CPU cores, and thus optimize the utilization of computers with multi-core processors. The embodiments leverage the performance advantages introduced with multi-core CPUs without requiring substantial redesign of application software. Also, the techniques and systems described overcome challenges associated with executing some existing join operations using distributed processing that can be restricted based on their sequential execution behavior.

FIG. 1 is a diagram of an example environment for implementing a join tool optimized for parallel processing computer systems (e.g., multi-core processors). As shown, the environment 100 includes an internal network 110, including a data analytics system 140, that is further connected to the Internet 150. The Internet 150 is a public network connecting multiple disparate resources (e.g., servers, networks, etc.). In some cases, Internet 150 may be any public or private network external to the internal network 110 or operated by a different entity than internal network 110. Data may be transferred over the Internet 150 between computers and networks connected thereto using various networking technologies, such as, for example, ETHERNET, Synchronous Optical Networking (SONET), Asynchronous Transfer Mode (ATM), Code Division Multiple Access (CDMA), Long Term Evolution (LTE), Internet Protocol (IP), Hypertext Transfer Protocol (HTTP), HTTP Secure (HTTPS), Domain Name System (DNS) protocol, Transmission Control Protocol (TCP), Universal Datagram Protocol (UDP), or other technologies.

As an example, the internal network 110 is a local area network (LAN) for connecting a plurality of client devices with differing capabilities, such as handheld computing devices, illustrated as smart phone 130*a* and laptop computer 130*b*. Also illustrated as connected to the internal network 110 is desktop computer 130*c*. The internal network 110 may be a wired or wireless network utilizing one or more network technologies, including, but not limited to, ETHERNET, WI-FI, CDMA, LTE, IP, HTTP, HTTPS, DNS, TCP, UDP, or other technologies. The internal network 110 can support access to a local storage system, shown as database 135. As an example, database 135 can be employed to store and maintain internal data, or data otherwise obtained from sources local to the internal network 110 resources (e.g., files created and transmitted using client devices 130).

As shown in FIG. 1, the Internet 150 can communicatively connect various data sources that are externally located from the internal network 110, illustrated as databases 160, server 170, and web server 180. Each of the data sources connected to the Internet 150 can be used to access and retrieve electronic data, such as data records, for analytical processing of the information contained therein by a data processing platform, such as data analytics applications. Databases 160 can include a plurality of larger capacity storage devices used to gather, store, and maintain large volumes of data, or records, that can subsequently be accessed to compile data serving as input into data analytics applications or other existing data processing applications. As an example, databases 160 can be used in a Big Data storage system that is managed by a third-party data source. In some instances, external storage systems, such as Big Data storage systems can utilize commodity servers, illustrated as server 170, with direct-attached storage (DAS) for processing capabilities.

Additionally, web server 180 can host content that is made available to users, such as a user of client device 130, via the Internet 150. A web server 180 can host a static website, which includes individual web pages having static content. The web server 180 can also contain client-side scripts for a dynamic website that relies on server-side processing, for example server-side scripts such as PHP, Java Server Pages (JSP), or ASP.NET. In some cases, web server 180 can act as an external data source by providing various forms of data that may be of interest to a business, for example data related to computer-based interactions (e.g., click tracking data) and content accessible on websites and social media applications. As an example, a client computer 130 can request content available on the Internet 150, such as a website hosted by web server 180. Thereafter, clicks on hypertext links to other sites, content, or advertisements, made by the user while viewing the website hosted by web server 180 can be monitored, or otherwise tracked, and sourced from the cloud to server as input into a data analytics platform for subsequent processing. Other examples of external data sources that can be accessible by a data analytics platform via the Internet 150, for instance, can include but are not limited to: external data providers, data warehouses, third-party data providers, Internet Service Providers, cloud-based data providers, Software as a service (SaaS) platforms, and the like.

The data analytics system 140 is a computer-based system utilized for processing and analyzing large amounts of data that is collected, gathered, or otherwise accessed from the multiple data sources, via the Internet 150 for instance. The data analytics system 140 can implement scalable software tools and hardware resources employed in accessing, preparing, blending, and analyzing data from a wide variety of data sources. For instance, the data analytics system 140 supports the execution of data intensive processes and workflows. The data analytics system 140 can be a computing device used to implement data analytics functions including the optimized hash join techniques described herein. The data analytics system 140 can comprise a hardware architecture using multiple processor cores on the same CPU die, for example, as discussed in detail in reference to FIG. 3. In some instances, the data analytics system 140 further employs dedicated computer devices (e.g., servers), shown as data analytics server 120, to support the large-scale data analytics implemented by the system.

The data analytics server 120 provides a server-based platform for implementing some analytic functions of the system 140. For example, more time-consuming data processing can be offloaded to the data analytics server 120 which may have greater processing and memory capabilities than other computer resources available on internal network 110, such as a desktop computer 130c. Moreover, the data analytics server 120 can support centralized access to information, thereby providing a network-based platform to support sharing and collaboration capabilities among user accessing the data analytics system 140. For example, the data analytics server 120 can be utilized to create, publish, and share applications and application program interfaces (APIs), and deploy analytics across computers in a distributed networking environment, such as internal network 110. The data analytics server 120 can also be employed to perform certain data analytics tasks, such as automating and scheduling the execution of data analytic workflows and jobs using data from multiple data sources. Also, the data analytics server 120 can implement analytic governance capabilities enabling administration, management and control functions. In some instances, the data analytics server 120 is configured to execute a scheduler and service layer, supporting various parallel processing capabilities, such as multi-threading of workflows, and thereby allowing multiple data-intensive processes to run simultaneously. In some cases, the data analytics server 120 is implemented as a single computer device. In other implementations, the capabilities of the data analytics server 120 are deployed across a plurality of servers, so as to scale the platform for increased processing performance, for instance.

The data analytics system 140 can be configured to support one or more software applications, illustrated in FIG. 1 as data analytics applications 145. The data analytics applications 145 implement software tools that enable capabilities of the data analytics platform. In some cases, the data analytics applications 145 provide software that supports networked, or cloud-based, access to data analytic tools and macros to multiple end users, such as clients 130. As an example, the data analytics applications 145 allow users to share, browse and consume analytics in a manner similar to a mobile application store or other cloud-based service. Analytic data, macros and workflows can be packaged and executed as a smaller scale and customizable analytic application (i.e., app), for example, that can be accessed by other users of the data analytics system 140. In some cases, access to published analytic apps can be managed by the data analytics system 140, namely granting or revoking access, and thereby providing access control and security capabilities. The data analytics applications 145 can perform functions associated with analytic apps such as creating, deploying, publishing, iterating, updating and the like. The data analytics applications 145 include a join tool implementing techniques that take advantage of the hardware resources of parallel processing computer systems.

Additionally, the data analytics applications 145 can support functions performed at various stages involved in data analytics, such as the ability to access, prepare, blend, analyze, and output analytic results. In some cases, the data analytics applications 145 can access the various data sources, retrieving raw data, for example in a stream of data. Data streams collected by the data analytics applications 145 can include multiple records of raw data, where the raw data is in differing formats and structures. After receiving at least one data stream, the data analytics applications 145 perform operations to allow records of the data stream to be used as an input into data analytic operations. Moreover, analytic functions involved in statistic, qualitative, or quantitative processing of records, such as predictive analytics (e.g., predictive modelling, clustering, data investigation) can be implemented by data analytics applications 145. The data analytics applications 145 can also support a software tool to design and execute repeatable data analytics workflows, via a visual graphical user interface (GUI). As an example, a GUI associated with the data analytics applications 145 offer a drag-and-drop workflow environment for data blending, data processing, and advanced data analytics. Moreover, a workflow can include a series of data processing tools that perform specific processing operations or data analytics functions, including the optimized join tool in accordance with the techniques and systems described herein.

Figure 2A:
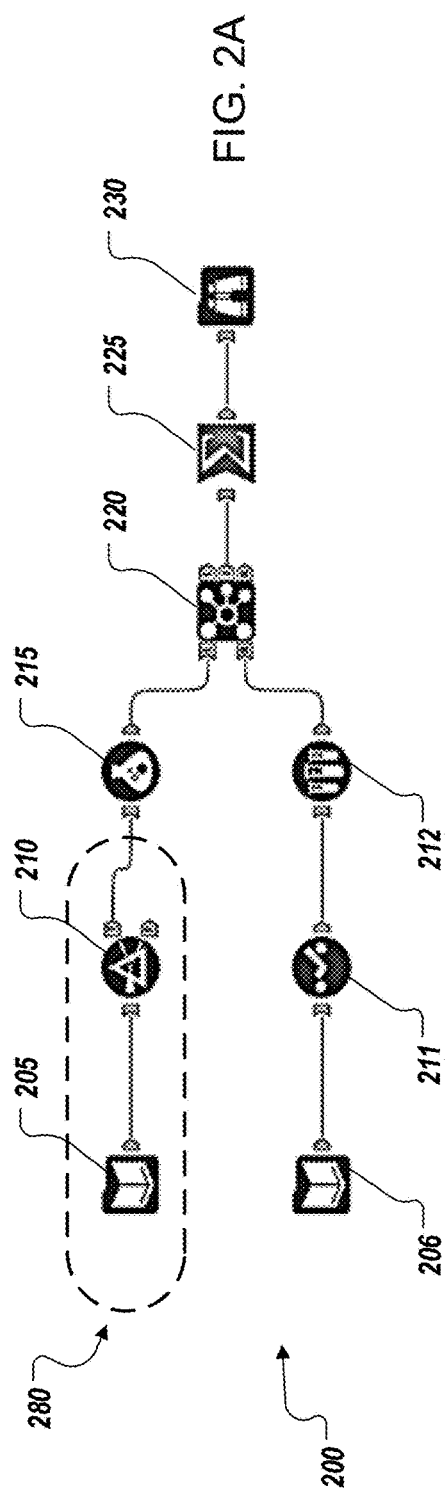
FIGS. 2A-2B are diagrams of an example of a data analytics workflow implementing a join tool that is optimized for parallel processing computer systems according to one embodiment.

FIG. 2A shows an example of a data analytics workflow 200 employing the optimized join tool. In one embodiment, the data analytics workflow 200 is created using a visual workflow environment supported by a GUI of the data analytics system 140. The visual workflow environment enables a set of drag and drop tools that eliminate the need of providing software code to design a workflow and eliminate the need to identify complex formulas to be implemented by a workflow. In another embodiment, the workflow 200 is created and described in a document, such as an extensible markup language (XML) document. The data analytics workflow 200 is executed by a computer device of the data analytics system 140. However, in other embodiments the data analytics workflow 200 is deployed to another computer device that may be communicatively connected, via a network, to the data analytics system 140.

A data analytics workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. According to the data aggregation aspects of the data analytics platform (shown in FIG. 1), a record including an aggregated group of individual records can be passed through the tools of a workflow, which allows for the individual processing operations to operate more efficiently on the data. The described data aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools can execute in parallel.

As illustrated, the workflow 200 of FIG. 2A includes input/output tools, illustrated as input tools 205 and 206 and browse tool 230. Input tools 205 and 206 function to access records from particular locations, such as on a local desktop, in a relational database, in the cloud, or third-party systems. The inputs tools 205 and 206 bring into the workflow the accessed records and provide the records to the subsequent tools of the workflow 200. In this example, input tool 205 provides accessed records to filter tool 210 and input tool 206 provides accessed records to select tool 211. Browse tool 230 is located at the end of the workflow 200 and receives the output resulting from the execution of each of the upstream tools of the workflow 200. Although browse tool 230 is located at the end of the workflow 200 in this example, the browse tool 230 can be added at any point in a workflow to review and verify results from execution of upstream tools of the workflow.

In continuing with the example of FIG. 2A, the workflow 200 includes preparations tools, shown as filter tool 210, select tool 211, formula tool 215, and sample tool 212. Filter tool 210 queries records based on an expression and splits the data into two streams, a true stream that includes records that satisfy the expression and a false stream that includes records that do not satisfy the expression. Select tool 211 can be used to select, deselect, reorder and rename fields, change field type or size, and assign a description. The data formula tool 215 creates or updates fields using one or more expressions to perform a broad variety of calculations and/or operations. The sample tool 212 limits a received stream of records to a number, percentage, or random set of records.

The workflow 200 also includes an optimized join tool 220 that blends multiple data sources. Specifically, the optimized join tool 220 combines two input data streams based on common fields (or record position). In the joined output produced by the optimized join tool 220, each row contains data from both inputs. An optimized join tool included in a workflow implements hash join techniques, discussed in detail below with reference to FIGS. 3A and 3B. The optimized join tools, such as join tool 220, are designed to be hardware conscious by distributing tasks associated with the join operation to multiple threads and leveraging the parallel processing capabilities of multi-core CPUs.

The workflow 200 of FIG. 2A is also shown to include a summarize tool 225 which is a parse and transform tool that can restructure and re-shape data to a format needed for further analysis. The summarize tool 225 can also perform summarization of data by grouping, summing, counting, spatial processing, and string concatenation. In only embodiment, the output generated by the summarize tool 225 contains only the results of the calculation(s).

In some embodiments, execution of workflow 200 will cause the input tool 205 to pass records one at a time through the filter tool 210 and formula tool 215, until all records are processed and have reached the join tool 220. Thereafter, the input tool 206 will begin passing records one at a time through the select tool 211 and sample tool 212, until the records are passed to the same join tool 220. Some individual tools of the workflow 200 can possess the capability to implement their own parallel operation, such as initiating a read of a block of data while processing the last block of data or breaking computer-intensive operations, such as a sort tool, into multiple parts. However, in some existing workflow techniques, each record from a set of records is individually processed by each tool of the workflow one record at a time, in a pipeline fashion, until a tool in the workflow is reached that requires multiple records to perform the processing operation (e.g., sort tool, join tool, summarize tool, etc.)

Figure 2B:
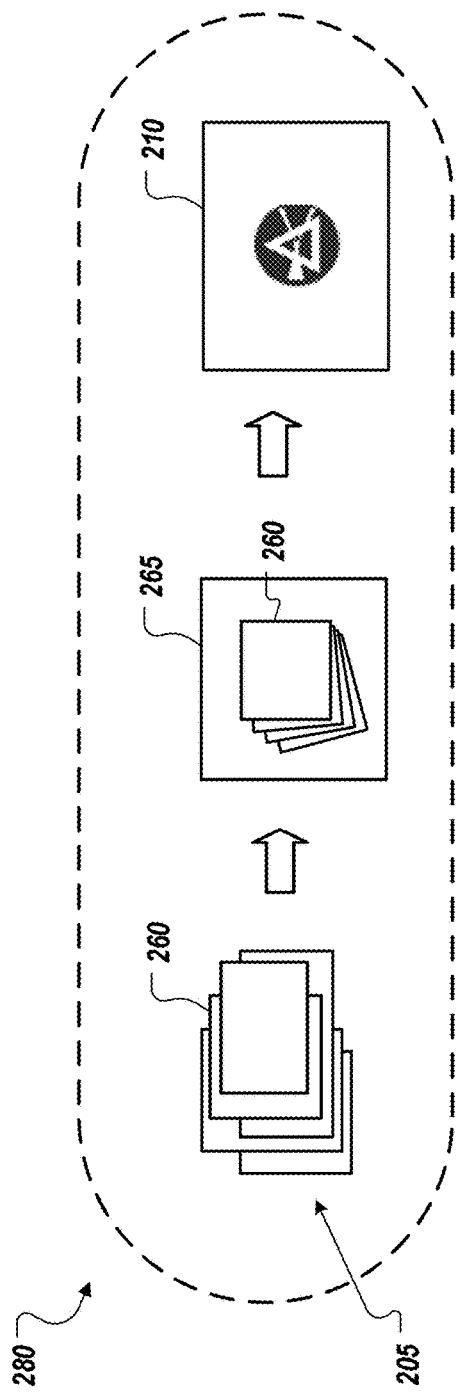

FIG. 2B shows an example of a portion 280 of the data analytics workflow 200 grouping records using data aggregation techniques. As illustrated in FIG. 2B, a data stream can be retrieved including multiple records 260 in association with executing input tool 205 to bring data into the upper portion of the workflow 200. In this example a data aggregation technique is applied to the records 260 to allow for parallel processing of small portions of the data stream. The data aggregation technique includes grouping records 260 from the data stream into multiple record packets 265. Subsequently, each record packet 265 is passed through the workflow, and processed through the multiple tools in the workflow 200 until reaching a tool in the workflow that requires multiple packets 265, or reaching a point in the workflow where there are no more tools along the path the record packets 265 are traversing. In an implementation, the data stream is an order of magnitude larger than a record packet 265, and a record packet 265 is an order of magnitude larger than a record 260. Thus, a number of multiple records 260, that is a small portion of the sum of records contained in the entire steam, can be aggregated into a single record packet 265. As an example, a record packet 265 can be generated to have a format including a total length of the packet in bytes, and the multiple aggregated records 260 (e.g., one record after another). A record 260 can have a format including the total length of the record in bytes, and multiple fields. However, in some instances, an individual record 260 can have a size that is comparatively larger than a predetermined capacity for a record packet 265. Accordingly, an implementation involves utilizing a mechanism to handle this scenario and adjust for packetizing substantially large records. Thus, the data aggregation techniques described can be employed in instances where records 260 may exceed the designed maximum size for the record packets 265.

FIG. 2B shows a record packet 265 being passed to a next successive processing operation in the data analytics workflow 200, which in this example is filter tool 210. In some cases, records 260 are aggregated into multiple record packets 265 of a predetermined size capacity. According to the techniques described, the maximum size of a record packet 265 is constrained by, or otherwise tied to, the hardware of a computer system used to implement the data analytics system 140 shown in FIG. 1. Other implementations can involve determining a size of record packets 265 that is dependent upon system performance characteristics, such as the load of a server. In one embodiment, an optimally-sized capacity for record packets 265 can be predetermined (at startup or compilation time) based on a factorable relationship to the size of the cache memory used in the associated system architecture. In some cases, packets are designed to have a direct relationship (1-to-1 relationship) to cache memory. For example, record packets 265 can be created such that each packet is less than or equal to the size (e.g., storage capacity) of the largest cache on the target CPU. Restated, records 260 can be aggregated into cache-sized packets. As an example, utilizing a computer system having a 64 MB cache to implement the data analytics applications 145 described yields record packets 265 designed with a predetermined size capacity of 64 MB. It should be appreciated that optimizing the capacity of the record packets 265 used in the data aggregation techniques involves a tradeoff between an increased synchronization effort between threads (associated with utilizing smaller sized packets), and potential decreased cache performance or increased granularity/latency in processing per packet (associated with utilizing larger sized packets).

In some embodiments, while the size capacity for record packets 265 can be fixed, the number of records that can be appropriately aggregated to form each record packet 265 length can be a variable that is dynamically adjusted by the system as necessary or suitable. In some existing database systems, each record is generated and processed at a single fixed length (e.g., 1 KB). In accordance with the techniques described, records packets 265 can be formatted using variable sizes, or lengths, to allow for optimally including as many records as possible into each packet having a predetermined maximum capacity. For example, a first record packet 265 can be generated to hold a substantially large amount of data, including a number of records 260 to form the packet at a size of 2 MB. Thereafter, a second record packet 265 can be generated and passed to a tool as soon as it is deemed ready. Continuing with the example, the second record packet 265 can include a comparatively smaller number of aggregated records than the first packet, reaching a size of 1 KB, but potentially decreasing the time latency associated with preparing and packetizing data prior to being processed by the workflow. Accordingly, in some embodiments, multiple record packets 265 traverse the system having varied sizes that are limited by the predetermined capacity, and further not exceeding the size of the cache memory. In one embodiment, optimizing a variable size for a packet is performed for each packet that is generated on a per-packet basis. Other implementations can determine optimal sizes for any group or number of packets based on various tunable parameters to further optimize performance including, but not limited to: the type of tools used, minimum latency, maximum amount of data, and the like. Thus, aggregating can further include determining an optimal number of records 260 to be placed into a record packet 265 in accordance with the packet's determined variable size.

According to some implementations, large amounts of records 260 can be processed, analyzed, and passed through the various tools as record packets 265 formed using aggregation techniques, thereby increasing data processing speed and efficiency. For example, filter tool 210 can perform processing of a plurality of records 260 that have been aggregated into the received record packet 265, as opposed to processing each record of a plurality of records 260 individually, in the manner of some existing data analytics platforms. Thus, the speed of executing the flow is increased according to the techniques described by enabling parallel processing of multiple aggregated records, without necessitating a software redesign of the respective tools. Additionally, aggregating records into packets can amortize the synchronization overhead. For instance, processing individual records can cause large synchronization costs (e.g., synchronizing record-by-record). In contrast, by aggregating a plurality of records into a packet, the synchronization costs associated with each of the multiple records is reduced to synchronizing a single packet (e.g., synchronization packet-by-packet).

Moreover, in some instances, each record packet 265 is scheduled for processing in a separate thread as available, thus optimizing data processing performance for parallel processing computer systems. As an example, if the data analytics system 140 utilizes multiple threads running independently on multiple CPU cores, each record packet from a plurality of record packets can be distributed for processing by a respective thread on its corresponding core. Therefore, the data aggregation techniques described can leverage various parallel processing aspects of computer architecture (e.g., multi-threading) to optimize processor utilization, by effectuating data processing across a larger set of CPU cores.

Figure 3A:
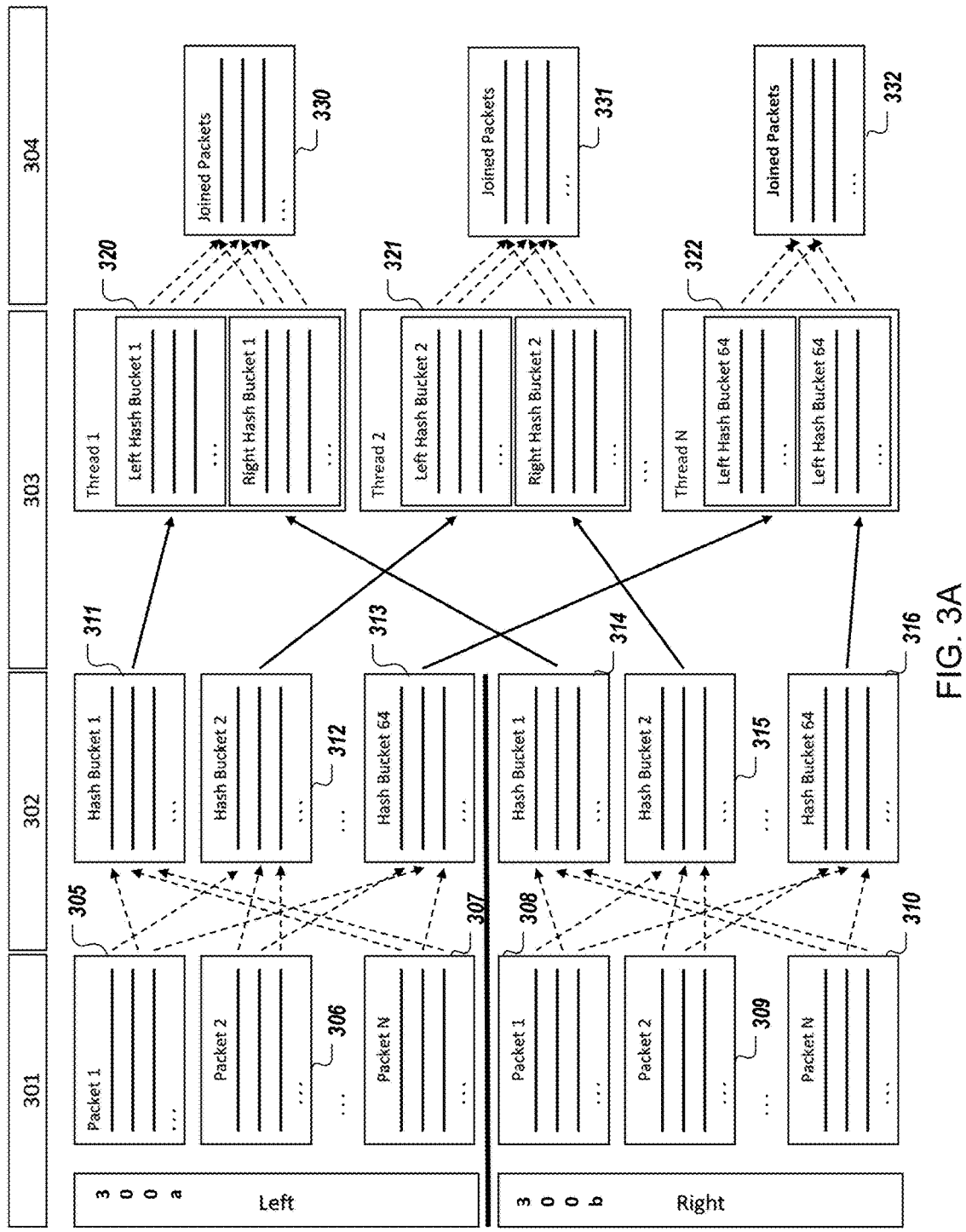
FIG. 3A is a diagram of an example process for implementing hash join techniques that are optimized for parallel processing computer systems according to one embodiment.

FIG. 3A is a diagram of an example process for performing a hash join in a way optimized for parallel processing computer systems. The hash join techniques described herein improve the speed and performance of join operations performed between data streams in the data analytics system 140. The hash join techniques are performed as part of an optimized joint tool, such as the optimized joint tool 220 of FIG. 2A. The hash join techniques increase the execution speed of a join operation and the overall execution speed of a workflow by dividing the join operation into separate parts that can be processed asynchronously using multiple processor cores of the data analytics system 140. FIG. 3A illustrates an example of a hash join technique as executing the join operation in two main phases: a partitioning phase 301-302 and a joining phase 303-304. According to some embodiments, the hash join techniques can be configured to implement other existing hash join algorithms used in database management systems, for example Grace hash join, hybrid hash join, and the hashed loops join.

Operation 301 of the partitioning phase includes receiving as an input at least two data streams 300a and 300b that are to be joined. The data streams 300a and 300b, for example, are received from one or more tools in a workflow. Data stream 300a is referred to as the "left data stream 300a" and data stream 300b is referred to as the "right data stream 300b." Each of the data streams 300 includes multiple records. For example, each data stream 300 can include records of a different comma-separated values (CSV) file. The records of each data stream 300 are divided into packets. Specifically, packet$_1$ 305, packet$_2$ 306 through packet$_N$ 307 are generated from left data stream 300a and packet$_1$ 308, packet$_2$ 309 through packet$_N$ 310 are generated from right data stream 300b. In one embodiment, the packets are generated according to the record aggregation techniques described above with reference to FIG. 2B. In some embodiments, the records of the data streams 300 are already divided into packets when they are received by the optimized join tool. For example, the packets may have been generated during upstream processing within a workflow. When the records are received in packets, there is no need for the optimized join tool to generate packets again.

The partitioning phase of the hash join technique, as shown in FIG. 3A, continues to operation 302. At operation 302 a hash is computed for each record included in the packets of the data streams 300. To compute a hash for a record, a hash function is applied to the attributes of the record (e.g., the values of particular fields of the record) that serve as the objects to be joined. For example, the records may each contain multiple fields, of which only a subset of the fields are common to the records from both data streams and are to be used in the join operation. The join tool determines the fields that are common to both of the data streams 300. For each record, the join tool then hashes together the data values in the record from only the determined common fields. The hash function used to compute the hash of a record may be, for example, the SpookyHash or the MD-5 hash function. In one embodiment, the hash computed for each record is a 128-bit value.

As part of operation 302, the records of each data stream 300 are organized into hash buckets based on their respective hashes. A hash bucket is a grouping of records. The number of hash buckets into which records of each data stream 300 are organized is fixed in one embodiment. In the example of FIG. 3A, the records of each data stream 300 are organized into sixty four buckets. Specifically, left data stream 300a is organized into hash bucket$_1$ 311, hash bucket$_2$ 312 through hash bucket$_{64}$ 313 and right data stream 300b is organized into hash bucket$_1$ 314, hash bucket$_2$ 315 through hash bucket$_{64}$ 316. The number of hash buckets used is a tunable parameter that is determined based on the hardware architecture of the data analytics system 140. In one embodiment, the number of hash buckets used for the data streams is dependent on the number of threads available to process the join operation and/or the number of processor cores of the data analytics system 140. Hence, in the example of FIG. 3A sixty four buckets may have been selected because there are sixty four threads available to process the join operation or because the data analytics system 140 includes sixty four processor cores.

A subset of bits of the hash computed for each record is used to assign the record to a hash bucket. Specifically, a select number of the least significant bits (LSBs) of the hash computed for each record are used to assign the record to a hash bucket. The number of LSBs used is determined based on the number of hash buckets being used for each data stream 300. In one embodiment, the number of LSBs used is determined according to the following equation where X is the number of LSBs:

$$X = \frac{\log(\text{number of hash buckets})}{\log 2}$$

Each hash bucket, from the set of hash buckets of a data stream 300, is associated with a different combination of LSBs. Hence, for each record of a data stream 300, the optimized join tool determines the LSBs of the hash computed for the record and assigns the record to the hash bucket associated with the LSBs from set of hash buckets of the stream 300. In the example of FIG. 3A, since there are 64 buckets for each data stream 300, based on the equation from above, six LSBs of the hash computed for a record are used to assign the record to a hash bucket. Specifically, each record within packets 305-307 is placed into a hash bucket associated with its corresponding six LSBs from hash buckets 311-313. Similarly, each record within packets 308-310 is placed into a hash bucket associated with its corresponding six LSBs from hash buckets 314-316. Furthermore, FIG. 3A illustrates that records within the same record packet can be placed into separate hash buckets, based on the computed hash. For instance, records within packet$_1$ 305 (represented by straight lines) are illustrated as being respectively placed (represented by dashed arrows) into each of the hash buckets hash buckets 311, 312, and 313.

The hash buckets 311-316 have the property that records with the same LSBs share the same logical bucket even when part of a different data stream 300. As an example, records of the left data stream 300a assigned to hash bucket$_2$ 312 have the same LSBs as the record of the right data stream 300b assigned to hash bucket$_2$ 315.

At operation 303 of the joining phase, for each hash bucket of the left data stream 300a a corresponding hash bucket of the right data stream 300 is identified that is associated with the same LSBs to create a hash bucket pair. Each hash bucket pair is assigned to a different processing thread for joining the records of the hash bucket pair. Each thread is then assigned to a different processor core of the data analytics system 140 for processing. In one embodiment, if the cores of data analytics system 140 are exhausted and threads still remain, the remaining threads are assigned as the processing cores become available (e.g., round-robin). FIG. 3A illustrates that hash bucket$_1$ 311 is paired with hash bucket$_1$ 314 and the pair is assigned to thread$_1$ 320. Similarly, hash bucket$_2$ 312 is paired with hash bucket 315 and the pair is assigned to thread$_2$ 321. The pairing and assigning continues until hash bucket$_{64}$ 313 is paired with hash bucket$_{64}$ 316 and assigned to thread$_N$ 322.

Based on using the LSBs to organize the records into hash buckets, each hash bucket pair includes the records that are needed by the corresponding thread to perform a join without needing records from other hash bucket pairs/threads. As a result, the threads can process hash bucket pairs asynchronously and independently using the multiple cores of the data analytics system 140. This divide-and-conquer strategy allows the optimized join tool to leverage the multi-core architecture of the data analytics system 140.

At operation 304, shown as the last stage of the join phase, each thread sorts the records in each hash bucket of its corresponding pair. Alternatively, each bucket of a pair can be sorted by a different thread. Records in a hash bucket are sorted based on their computed hashes. For example, records can be sorted in an ascending or descending order according to their respective hash. For each record within a hash bucket, the thread determines whether to join the record with one more records in the other hash bucket of the pair. In one embodiment, the thread joins two records if the full 128-bit hashes of the two records match. If the thread determines that a record can be joined with one or more other records, the thread performs the join operation. In the case where a record does not join with any other records, the record is considered to be un-joinable and subsequently pushed to an un-joined output. In some embodiments, the un-joinable output is used as a filter to remove records that are incapable of joining from being included in any further join operations, thereby improving processing speed of the techniques. According to an embodiment, the join at operation 304 is accomplished by considering the hashes of records, without requiring a comparison of the actual data within the records. In accordance with the embodiments utilizing a 128 bit hash, the potential of collision is substantially small. Thus, the described hash join techniques allow for each computed hash to appropriately correspond to a single set of join fields, and in turn for each field to be appropriately joined by using its corresponding hash (reducing errors associated with collisions).

Operation 304, as shown in FIG. 3A, generates joined packets 330, 331, and 332. Specifically, the joined records from each hash bucket pair are added to at least one corresponding joined packet (represented by dashed arrows). The example in FIG. 3A shows: $thread_1$ 320 generating joined packets 330 from joining the hash $bucket_1$ pair; $thread_2$ 321 generating joined packets 331 from joining the hash buckets pair; and continuing execution for each pair until $thread_N$ 322 generates joined packets 332 from joining the hash $bucket_{64}$ pair. The joined packets 330-332 include joined records from both data streams 330 which is the output of the join phase. The output can then be provided by the optimized join tool to the next tool in the corresponding workflow.

In some implementations, as the join phase is performed by threads running on independent processors, join operations for at least a group of the hash bucket pairs can be processed concurrently. Thus the described hash join techniques increase the speed of executing a join operation within a workflow, which in turn can lead to significant improvements in the overall speed of the data analytics applications 145 (e.g., in processing large amounts of data). Thus, the techniques described enhance the join tools by functioning in a manner that realizes the advantages of parallel processing, without necessitating a substantial software redesign of each of the respective join tools.

Figure 3B:
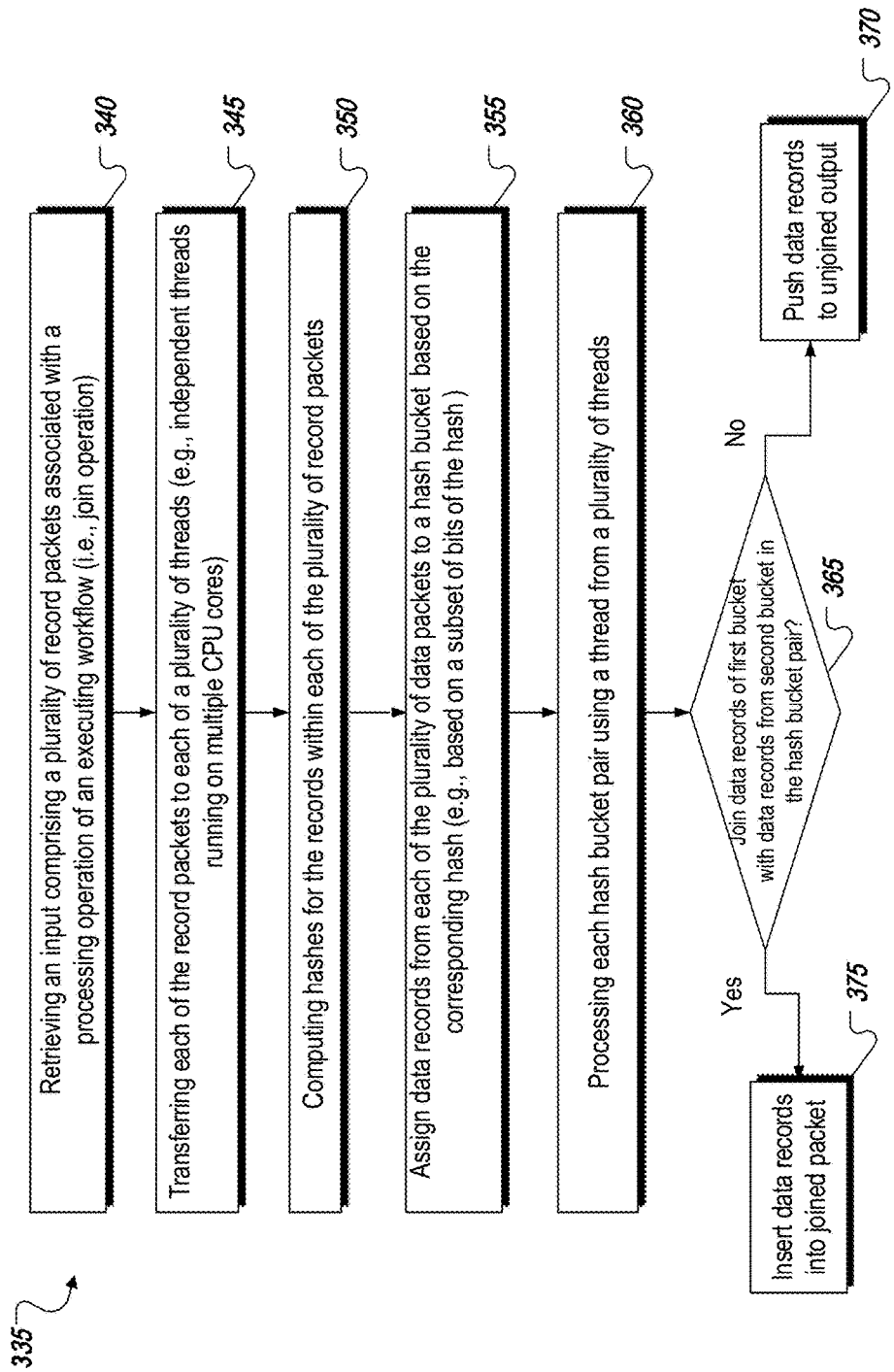
FIG. 3B is a flow chart of an example process of implementing hash join techniques that are optimized for parallel processing computer systems according to one embodiment.

FIG. 3B is a flow chart of an example process 335 for performing hash join techniques that are optimized for various parallel processing computer systems. The process 335 may be implemented by an optimized join module and the data analytics system 140 components described relative to FIG. 1, or by other configurations of components.

At 340, an input is retrieved comprising a plurality of record packets of at least two data streams. The plurality of records packets are associated with a processing operation (join operation) of an executing data analytics workflow. In some instances, the data analytics workflow executes on a computer device (shown in FIG. 1) and includes one or more data processing operations that can be used to perform a particular data analytics function, such as the tools described in referring to FIG. 2A. In the example shown in FIG. 2A, an optimized join tool is included as a data processing operation within the executing workflow. The optimized join tool can be generally characterized as combining two retrieved input data streams, to produce a joined output. According to the embodiments, the join tool is optimized by implementing the hash join techniques described. Referring back to the example shown in FIG. 2A, the illustrated data analytics workflow involves executing multiple processing operations according to an operational sequence defined in the workflow. In the example, the optimized join tool receives its input directly from the output of previously executing operations, namely a formula tool and sample tool, based on the sequence of operations for the workflow. The optimized join tool retrieves its input streams as record packets that have been previously generated during the upstream processing within the workflow. Alternatively, the optimized join tool can retrieve input data streams as raw data streams, rather than packets. In this case, retrieving the input for the optimized join tool also involves aggregating the records of each data stream to form record packets. Thus, the optimized join tool is also configured to perform the optimized data aggregation techniques as descried with reference to FIG. 2B.

At 345, after retrieving the input, each of the plurality of record packets are transferred to a plurality of threads to handle processing for the optimized join tool operation. In some cases, assigning threads for executing the optimized join tool operations is accomplished by the scheduling aspects of the data processing kernel. According to the embodiments, the threads, at 345, are assigned to execute some tasks associated with the hash join techniques described herein. For instance, at 345, threads are employed to execute the partitioning phase operations of the hash join techniques, as discussed in detail in reference to FIG. 3A. In the embodiments, threads are scheduled per-packet, thus the hash join techniques are implemented in a hardware conscious manner that is optimized for utilizing various parallel processing technologies. For instance, the computer device running the workflow can include a plurality of processors, such as multiple cores implemented on a CPU. Therefore, each of a plurality of threads can run independently on a respective processor core of the multi-core CPU, for example, allowing the partitioning operations to execute concurrently and efficiently.

At 350, hashes are computed for the records within each of the plurality of record packets. The hashes are calculated at 350 as part of the partitioning phase of the hash join techniques, in order to subsequently use the hashing to divide, or otherwise partition, the join process, into smaller sub-processes. The hashing performed at 350 is implemented based on the hashing details described above with reference to FIG. 3A. In some instances, each record serves as input to a hash function, particularly hashing the fields that are being joined. In one embodiment, the output of the hash function is a 128-bit hash.

At 355, each record is assigned to a hash bucket from among a group of hash buckets of the corresponding data stream based on a subset of bits of the hash computed for the record. In the hash join techniques described, hash buckets are used as a mechanism for further partitioning input data into hash groups. Each of the two data streams of FIG. 3A, illustrated as left data stream 300a and right data stream 300b, uses sixty four hash buckets for grouping the records of the corresponding data stream. Each hash bucket of one data stream has a corresponding hash bucket in the other data stream that is associated with the same subset of bits. The two buckets associated with the same subset of bits are referred to as a hash bucket pair. As discussed in detail with reference to FIG. 3A, the hash buckets have the property that records with the same subset of bits, will also share the same logical bucket (or hash bucket pair). The abovementioned hash function is used to insert each record to a slot within one of the hash buckets assigned to a data stream. Thus, records that are capable of joining together from each data stream, will have the same subset of bits, and will be placed in the same hash bucket pair. Continuing with the example from FIG. 3A, hash bucket₁ 311 of the left data stream 300*a* will have records that may join with records from hash bucket₁ 314 of the right data stream 300*b*, and vice versa.

At 360, each hash bucket pair is processed using a separate thread, in order to execute the remaining tasks of the optimized join tool. As discussed in detail with reference to FIG. 3A, each thread assigned to a bucket pair can execute the join phase operations of the hash join techniques. In the embodiments, because threads are executing per-bucket pair, each thread can be processed independently without the risk that that records may need to be considered across the bucket boundaries. Thus, the hash join techniques described can overcome challenges associated with using parallel processing for join operations that may require execution completed in an ordered, or sequential, manner. Additionally, in executing the join phase of the hash join techniques, processing at 360 includes sorting the records in each of the hash bucket pairs, using the corresponding hashes. As a result, each hash bucket of a respective pair, is associated with a sorted list of records, sorted by hash. In some embodiments, the sorting for each hash bucket pair is performed in a separate worker thread.

Thereafter, at 365 each thread determines whether records of its corresponding hash bucket pair can be joined. In some embodiments, the check is performed iteratively for each sorted record in a hash bucket of a hash bucket pair. For example, a currently processed record within a hash bucket is checked against the sorted records in the other hash bucket of a hash bucket pair. Thus, a determination is made as to whether the current record in a first hash bucket of a pair joins with any of the records from a second hash bucket of the pair. The determination, at 365, is accomplished using the associated hashes, and does not require any scanning or comparison of the actual data values of the records. Consequently, the speed of executing the join techniques described is substantially increased by utilizing significantly less CPU time (e.g., eliminates time associated with performing a lookup and compare of data indexed by the hash values, minimizes number of disk reads, etc.).

In the instances when it is determined that records from a hash bucket pair can be joined (i.e., "Yes"), at 375, the records are joined and the joined records are inserted into, or otherwise used to generate, one or more joined packets. Alternatively, in the case where it is determined that a record is not capable of being joined with another record from the counterpart hash bucket (i.e., "No"), the record is pushed to an un-joined output at 370, so as to not be included in the results of the join. In some implementations, generating joined packets at 375 from the joined results is performed concurrently for the respective hash bucket pairs. Results from the hash join techniques can be provided as an output for the particular optimized join tool being executed. In the example of FIG. 2A, the optimized join tool output, namely the joined packets, are passed downstream in the workflow 200. In some embodiments, the optimized join tool output is provided for display as graphical information for a GUI associated with the data analytics applications 145.

Figure 4:
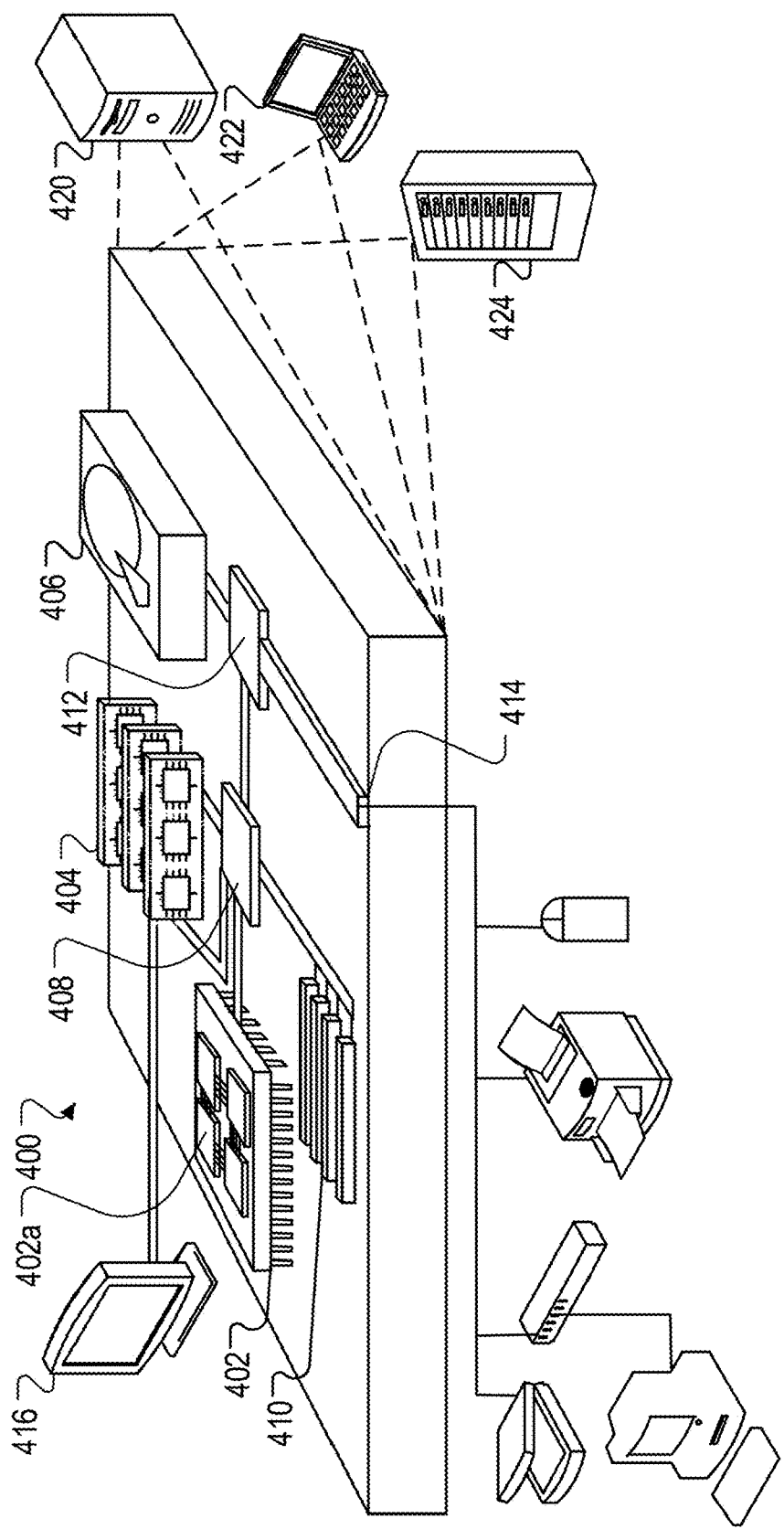
FIG. 4 is a diagram of an example computing device that may be used to implement the described systems and methods according to one embodiment.

FIG. 4 is a block diagram of computing devices 400 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. In some cases, computing device 450 is intended to represent various forms of mobile devices, such as personal digital assistants, cellular telephones, smartphones, and other similar computing devices. Additionally, computing device 400 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. According to the embodiments, the processor 402 has a design that implements parallel processing technologies. As illustrated, the processor 402 can be a CPU including multiple processor cores 402*a* on the same microprocessor chip, or die. The processor 402 is shown as having processing cores 402*a*. In some cases, the processor 402 can implement 2-32 cores. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk. Memory of the computing device 40 can also include a cache memory, that is implemented as a random access memory (RAM) that the microprocessor can access more quickly than it can access regular RAM. This cache memory can be integrated directly with a CPU chip or placed on a separate chip that has a separate bus interconnect with the CPU.

The storage device 406 is capable of providing mass storage for the computing device 400. In one implementation, the storage device 406 may be or contain a non-transitory computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above.

The high speed controller 408 manages bandwidth-intensive operations for the computing device 400, while the low speed controller 412 manages lower bandwidth-intensive operations. Such allocation of functions is exemplary only.

In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (shown in FIG. 1). Each of such devices may contain one or more of computing device 400, and an entire system may be made up of multiple computing devices 400 communicating with each other.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 is shown to include a software architecture for the data analytics system 140 shown in FIG. 1 implementing various software modules, which can be distributed between an applications layer and a data processing kernel. These can include executable and/or interpretable software programs or libraries, including tools and services of the data analytics applications 145, such as described above. The number of software modules used can vary from one implementation to another. Moreover, the software modules can be distributed on one or more data processing apparatus connected by one or more computer networks or other suitable communication networks. The software architecture includes a layer, described as the data processing kernel, implementing data analytics engine 520. The data processing kernel, as illustrated in FIG. 5, can be implemented to include features that are related to some existing operating systems. For instance, the data processing kernel can perform various functions, such as, scheduling, allocation, resource management. The data processing kernel can also be configured to use resources of an operating system of the data processing apparatus 500. In some cases, the data analytics engine 520 is the software component that runs a workflow developed using the data analytics applications 145. FIG. 5 shows the data analytics engine 520 as including an optimized data aggregation module 525, which implements the data aggregation aspects of the data analytics system 140. Additionally, optimized join module 530 implements, at least, the hash join techniques as described, and utilized by the optimized join tools of the data analytics applications 145. As an example, the data analytics engine 520, can load a workflow 515 as an XML file, for instance, describing the workflow along with the additional files describing the user and system configuration 516 settings 510. Thereafter, the data analytics engine 520 can coordinate execution of the workflow using the tools described by the workflow. The software architecture shown, particularly the data analytics engine 520, optimized data aggregation module 525, and the optimized join module 530, can be designed to realize advantages of hardware architectures containing multiple CPU cores, large amounts of memory, multiple thread design, and advanced storage mechanisms (e.g., solid state drives, storage area network).

The data processing apparatus 500 also includes hardware or firmware devices including one or more processors 535, one or more additional devices 536, a computer readable medium 537, a communication interface 538, and one or more user interface devices 539. Each processor 535 is capable of processing instructions for execution within the data processing apparatus 500. In some implementations, the processor 535 is a single or multi-threaded processor. Each processor 535 is capable of processing instructions stored on the computer readable medium 537 or on a storage device such as one of the additional devices 536. The data processing apparatus 500 uses its communication interface 538 to communicate with one or more computers 590, for example, over the network 580. Examples of user interface devices 539 include a display, a camera, a speaker, a microphone, a tactile feedback device, a keyboard, and a mouse. The data processing apparatus 500 can store instructions that implement operations associated with the modules described above, for example, on the computer readable medium 537 or one or more additional devices 536, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a non-transitory machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The invention claimed is:

1. A method of joining data records using a computer, the method comprising:
    identifying a first plurality of data records and a second plurality of data records;
    computing a hash for each data record in the first and second pluralities of data records;
    assigning data records of the first plurality of data records to a plurality of first groupings based on the computed hashes, wherein each first grouping is associated with a set of bits that are included in the computed hashes of the data records in the first grouping;
    assigning data records of the second plurality of records to a plurality of second groupings based on the computed hashes, wherein each second grouping is associated with a set of bits that are included in the computed hashes of the data records in the second grouping;
    assigning each respective first grouping and a respective second grouping to a respective worker thread, wherein the respective first grouping is associated with a same set of bits as the respective second grouping;
    determining, by the respective worker thread based on the computed hashes of the data records in the first and second groupings assigned to the respective worker thread, whether to join data records in the first grouping with data records in the second grouping;
    responsive to determining to join one or more data records in the first grouping with one or more data records in the second, joining, by the respective worker thread, the data records; and
    outputting, by the respective worker thread, the joined data records of the first and second groupings.

2. The method of claim 1, wherein the data records comprise a plurality of fields having values and wherein computing a hash for each data record in the first and second pluralities of data records comprises:
    identifying a subset of the plurality of fields of the data records that are common to data records in the first and second pluralities of data records; and
    computing hashes of values of the subset of the plurality of fields that are common to data records in the first and second pluralities of data records.

3. The method of claim 1, wherein determining, by the respective worker thread based on the computed hashes of the data records in the first and second groupings assigned to the respective worker thread, whether to join data records in the first grouping with data records in the second grouping comprises:
  determining to join a first data record in the first grouping with a second data record in the second grouping responsive to the first and second data records having matching hashes.

4. The method of claim 1, wherein determining whether to join data records in the first grouping with data records in the second grouping comprises:
  sorting the data records in the first grouping and the data records in the second grouping based on the hashes for the data records.

5. The method of claim 1, wherein the computer has a number of processor cores, and wherein a number of the first groupings and a number of the second groupings are determined responsive to the number of processor cores.

6. The method of claim 1,
  wherein different worker threads process the corresponding first and second groupings in parallel.

7. A computer for joining data records, the computer comprising:
  at least one computer processor; and
  a non-transitory computer-readable memory storing computer program instructions executable by the processor to perform operations comprising:
    identifying a first plurality of data records and a second plurality of data records;
    computing a hash for each data record in the first and second pluralities of data records;
    assigning data records of the first plurality of data records to a plurality of first groupings based on the computed hashes, wherein each first grouping is associated with a set of bits that are included in the computed hashes of the data records in the first grouping;
    assigning data records of the second plurality of records to a plurality of second groupings based on the computed hashes, wherein each second grouping is associated with a set of bits that are included in the computed hashes of the data records in the second grouping;
    assigning each respective first grouping and a respective second grouping to a respective worker thread, wherein the respective first grouping is associated with a same set of bits as the respective second grouping;
    determining, by the respective worker thread based on the computed hashes of the data records in the first and second groupings assigned to the respective worker thread, whether to join data records in the first grouping with data records in the second grouping;
    responsive to determining to join one or more data records in the first grouping with one or more data records in the second, joining, by the respective worker thread, the data records; and
    outputting, by the respective worker thread, the joined data records of the first and second groupings.

8. The computer of claim 7, wherein the data records comprise a plurality of fields having values and wherein computing a hash for each data record in the first and second pluralities of data records comprises:
  identifying a subset of the plurality of fields of the data records that are common to data records in the first and second pluralities of data records; and
  computing hashes of values of the subset of the plurality of fields that are common to data records in the first and second pluralities of data records.

9. The computer of claim 7, wherein determining, by the respective worker thread based on the computed hashes of the data records in the first and second groupings assigned to the respective worker thread, whether to join data records in the first grouping with data records in the second grouping comprises:
  determining to join a first data record in the first grouping with a second data record in the second grouping responsive to the first and second data records having matching hashes.

10. The computer of claim 7, wherein determining whether to join data records in the first grouping with data records in the second grouping comprises:
  sorting the data records in the first grouping and the data records in the second grouping based on the hashes for the data records.

11. The computer of claim 7, wherein the computer processor has a number of processor cores, and wherein a number of the first groupings and a number of the second groupings are determined responsive to the number of processor cores.

12. The computer of claim 7,
  wherein different worker threads process the corresponding first and second groupings in parallel.

13. A non-transitory computer-readable memory storing computer program instructions executable by a computer processor to perform operations for joining data records, the operations comprising:
  identifying a first plurality of data records and a second plurality of data records;
  computing a hash for each data record in the first and second pluralities of data records;
  assigning data records of the first plurality of data records to a plurality of first groupings based on the computed hashes, wherein each first grouping is associated with a set of bits that are included in the computed hashes of the data records in the first grouping;
  assigning data records of the second plurality of records to a plurality of second groupings based on the computed hashes, wherein each second grouping is associated with a set of bits that are included in the computed hashes of the data records in the second grouping;
  assigning each respective first grouping and a respective second grouping to a respective worker thread, wherein the respective first grouping is associated with a same set of bits as the respective second grouping;
  determining, by the respective worker thread based on the computed hashes of the data records in the first and second groupings assigned to the respective worker thread, whether to join data records in the first grouping with data records in the second grouping;
  responsive to determining to join one or more data records in the first grouping with one or more data records in the second, joining, by the respective worker thread, the data records; and
  outputting, by the respective worker thread, the joined data records of the first and second groupings.

14. The non-transitory computer-readable memory of claim 13, wherein the data records comprise a plurality of fields having values and wherein computing a hash for each data record in the first and second pluralities of data records comprises:
   identifying a subset of the plurality of fields of the data records that are common to data records in the first and second pluralities of data records; and
   computing hashes of values of the subset of the plurality of fields that are common to data records in the first and second pluralities of data records.

15. The non-transitory computer-readable memory of claim 13, wherein determining, by the respective worker thread based on the computed hashes of the data records in the first and second groupings assigned to the respective worker thread, whether to join data records in the first grouping with data records in the second grouping comprises:
   determining to join a first data record in the first grouping with a second data record in the second grouping responsive to the first and second data records having matching hashes.

16. The non-transitory computer-readable memory of claim 13, wherein the computer processor has a number of processor cores, and wherein a number of the first groupings and a number of the second groupings are determined responsive to the number of processor cores.

17. The non-transitory computer-readable memory of claim 13,
   wherein different worker threads process the corresponding first and second groupings in parallel.

* * * * *